(12) United States Patent
Takashige et al.

(10) Patent No.: US 8,046,521 B2
(45) Date of Patent: Oct. 25, 2011

(54) COMPUTER VIRTUALIZATION APPARATUS AND PROGRAM AND METHOD THEREFOR

(75) Inventors: Souichi Takashige, Hachiouji (JP); Tomoki Sekiguchi, Sagamihara (JP); Tomohide Hasegawa, Zama (JP)

(73) Assignee: Hitachi, Ltd., Tokyo (JP)

( * ) Notice: Subject to any disclaimer, the term of this patent is extended or adjusted under 35 U.S.C. 154(b) by 583 days.

(21) Appl. No.: 12/143,328

(22) Filed: Jun. 20, 2008

(65) Prior Publication Data

US 2009/0164991 A1 Jun. 25, 2009

(30) Foreign Application Priority Data

Dec. 21, 2007 (JP) ................................ 2007-330374

(51) Int. Cl.
*G06F 12/00* (2006.01)

(52) U.S. Cl. ......... 711/6; 711/209; 711/1; 711/E12.061; 718/100

(58) Field of Classification Search ........................ None
See application file for complete search history.

(56) References Cited

U.S. PATENT DOCUMENTS 7,409,487 B1 * 8/2008 Chen et al. ..................... 711/6

OTHER PUBLICATIONS

ISSN 1535-864X Intel Virtualization Technology, vol. 10, Issue 3, published Aug. 10, 2006.

* cited by examiner

*Primary Examiner* — Kevin Ellis
*Assistant Examiner* — Arvind Talukdar
(74) *Attorney, Agent, or Firm* — Mattingly & Malur, PC

(57) ABSTRACT

A hypervisor prepares a guest region identifier (RID)-physical region identifier (RID) mapping table for dynamically registering and managing items and performs RID conversion using the guest RID-physical RID mapping table. When the mapping table is used, since it is unnecessary to provide a specific information area representing logical partitions (LPARs) corresponding to respective guests in an RID to be converted, there is no limitation concerning the number of LPARs and a problem in operation can be eliminated.

6 Claims, 12 Drawing Sheets

FIG.4

| GUEST ID (401) | PHYSICAL RID (402) | GUEST RID (403) | ENTRY IN-USE FLAG (404) |
|---|---|---|---|
| 1 | 1100 | 100 | 1 |
| 1 | 1200 | 200 | 0 |
| 2 | 1300 | 100 | 1 |
| 2 | 1400 | 200 | 0 |

| GUEST ID (401) | PHYSICAL RID (402) | GUEST RID (403) | ENTRY IN-USE FLAG (404) | NUMBER OF REGISTERED ENTRIES (1001) | GENERATION NUMBER (1201) |
|---|---|---|---|---|---|
| 1 | 1100 | 100 | 1 | 2 | 2 |
| 1 | 1200 | 200 | 0 | 10 | 1 |
| 2 | 1300 | 100 | 1 | 10 | 2 |
| 2 | 1400 | 200 | 0 | 5 | 2 |

| GUEST ID (401) | PHYSICAL RID (402) | GUEST RID (403) | ENTRY IN-USE FLAG (404) | NUMBER OF REGISTERED ENTRIES (1001) |
|---|---|---|---|---|
| 1 | 1100 | 100 | 1 | 2 |
| 1 | 1200 | 200 | 0 | 10 |
| 2 | 1300 | 100 | 1 | 10 |
| 2 | 1400 | 200 | 0 | 5 |

137

COMPUTER VIRTUALIZATION APPARATUS AND PROGRAM AND METHOD THEREFOR

CLAIM OF PRIORITY

The present application claims priority from Japanese application serial no. JP2007-330374, filed on Dec. 21, 2007, the content of which is hereby incorporated by reference into this application.

BACKGROUND OF THE INVENTION

1. Field of the Invention

The present invention relates to a TLB virtualization technique in a computer virtualization technique.

2. Description of the Related Art

In recent years, a computer virtualization technique for causing plural virtual computers to simultaneously operate on a computer based on the architecture of a personal computer (hereinafter referred to as PC) has been attracting attention. Advantages such as a reduction in the number of actually operating computers and facilitation of operation and configuration changes through encapsulation of hardware are spreading in the market.

Many techniques concerning virtualization of computers such as main frames have been developed so far. However, in order to provide a high-performance, limitless, and flexible computer virtualization technique in the architecture of a PC, much contrivance is necessary not only in hardware such as a central processing unit (hereinafter referred to as CPU) but also in software for performing control.

As one of the virtualization techniques that have has been efficiently implemented, there is a translation look-aside buffer (hereinafter referred to as TLB) virtualization.

A TLB of a CPU as a premise of explanation of the background art is explained with reference to FIG. 3. When the CPU accesses a memory, the CPU specifies a position on the memory using a memory address. In a CPU including a paging mechanism, a program accesses a memory using an address on a virtual address system (hereinafter referred to as memory space) called virtual address. The CPU performs access after converting a value of the virtual address into a position on an actual memory. Usually, in order to perform the conversion at high speed and automatically, a cache memory for storing address conversion pairs is included in the CPU.

Depending on the architecture, in order to simultaneously store conversion pairs of plural memory spaces in one TLB, identifiers of memory spaces called region identifiers (hereinafter referred to as RIDs) may be used. Examples of such architecture include the Itanium (registered trademark) architecture of Intel Corporation. The present invention concerns such architecture that uses the TLB and the RIDs.

The RIDs are numbers for uniquely identifying memory spaces managed by an operating system (hereinafter referred to as an OS) on a computer. Usually, a page table (PT) corresponding to each of the memory spaces is allocated to the memory space. The page table (PT) is a correspondence table of virtual addresses and physical addresses managed by the OS. The OS registers the page table (PT) in the TLB referring to contents of the page table (PT) as required.

An example of the structure of the TLB is shown in a lower part of FIG. 3. A physical TLB includes information concerning an RID 301, a virtual address 302, and a physical address 303. A program on a CPU designates the physical address 303 on a memory by combining the RID 301 and the virtual address 302.

The CPU searches for entries in which a designated RID and a designated virtual address are equal to the RID 301 and the virtual address 302 in a TLB entry. The CPU accesses a memory indicated by the physical address 303 associated with the RID 301 and the virtual address 302. Actually, conversion of the virtual address 302 and the physical address 303 is managed for each section having a fixed size called a page rather than in the respective address units. Usually, the TLB operates as a cache for the page table. In this specification, since there is no significant reason for distinguishing the page and the respective addresses, an address refers to a general term of addresses and pages.

When there is no entry corresponding to the designated RID and the designated virtual address in the TLB entry, the CPU notifies the program of an exception signal. Usually, the OS detects an exception and registers, with reference to the page table, a set of an RID and a virtual address that cause the exception and a physical address corresponding to the virtual address in the TLB entry.

As a method with which the program designates an RID in the CPU, there is an architecture that uses region registers (hereinafter referred to as RRs). The RRs are registers exclusively used for storing RIDs of memory spaces used by a present program and are prepared in the CPU. An example of the RRs is shown in an upper part of FIG. 3. The RRs have areas for showing an RID 305 in specific bit strings of registers.

In a CPU having plural RRs, higher-order bits of a virtual address 306 may be an index number of an RR. In this system, an RID and a virtual address section of the RR designated by an RR designation section are compared with the RID 301 and the virtual address 302 of the TLB entry by a comparator 307. The physical address 303 of an entry in which the RID and the virtual address section and the RID 301 and the virtual address 302 coincide with each other is used.

The memory spaces are uniquely identified RIDs. It is likely that a different page table (PT) is used for each of the memory spaces and different address conversion is registered. In other words, even if the same virtual address is used, different physical addresses are accessed when RIDs are different. Moreover, since the OS dynamically manages the association of the RIDs and the page table, in different computers or OSs, even if the same RID and the same virtual address are designated, the RID and the virtual address may be converted into different physical addresses.

When a computer is virtualized, i.e., when plural OSs run on the same CPU, the OSs share the same TLB (TLB cache). A different page table (PT) is managed for each of the OSs and registered in the TLB in association with an independent RID. Since the association may be different for each of the OSs, when a TLB entry registered by another OS is used, the OS performs unintended conversion. In order to avoid such a situation, arbitrary processing for TLB resources is indispensable in an environment in which plural OSs run on a single CPU in parallel.

As a method of arbitrating TLB resources in the architecture described above, a method called RID partitioning is used in ISSN 1535-864X, Intel (registered trademark) Virtualization Technology Volume 10 Issue 03 (hereinafter referred to as Non-Patent Document 1). In this method, an RID is divided into a bit range for identifying a virtual computer and a bit range for identifying a memory space in the virtual computer. An OS can change only the bit range for identifying a memory space in the latter half.

SUMMARY OF THE INVENTION

In the method described in Non-Patent Document 1, since the bit range for identifying a virtual computer is present in the RID, an identical RID is not used among different virtual computers. Therefore, when an OS is switched, the OS does not refer to a TLB entry, which is registered by the OS before the switching, by mistake. Therefore, the OS does not perform unintended conversion. This method is excellent in that, when a guest OS is switched, it is unnecessary to execute processing for clearing a TLB entry, which takes a long processing time.

However, the number of bits for identifying virtual computers and the number of bits for identifying memory spaces are limited. In other words, the number of virtual computers that can simultaneously operate on a computer and the number of memory spaces are limited. In particular, in a method of virtualizing plural computers and aggregating the virtualized computers in one computer, there is a significant problem in that the number of computers that can simultaneously operate is limited.

The present invention has been devised in view of the problems and it is an object of the present invention to provide a computer virtualization apparatus that can eliminate, under a restriction that performance is not deteriorated, the limitation on the number of computers that can simultaneously operate.

In the present invention, the computer virtualization apparatus includes a mechanism for making an RID on a virtual computer and an RID on an actual computer different and managing conversion between the RIDs, as RID partitioning has. However, rather than using a conversion system employing a specific conversion formula as in RID partitioning, the computer virtualization apparatus has conversion table information dynamically generated and managed during execution of the conversion and converts the RIDs with reference to a conversion table.

In the present invention, in order to attain the object, there is provided a computer virtualization mechanism that causes plural OSs to simultaneously run. The computer virtualization mechanism includes a mapping table for managing association of identifiers of memory spaces on virtualized computers (guest RIDs) and identifiers used in an actual computer (physical RIDs), an RID converting section that converts an RID with emulation processing of a CPU register for substituting the RID as an opportunity with reference to the mapping table, and an RID table updating section that creates, when the association is not present in the mapping table, new association and adds the association to the mapping table.

BRIEF DESCRIPTION OF THE DRAWINGS

FIG. 4 is a diagram showing a guest RID-physical RID mapping table according to the first embodiment;

FIG. 5 is a diagram showing an example of expansion of a guest RID-physical RID mapping table according to a third embodiment of the present invention;

FIG. 10 is a diagram showing an example of expansion of a guest RID-physical RID mapping table according to a second embodiment of the present invention;

DESCRIPTION OF THE PREFERRED EMBODIMENTS

Exemplary embodiments of the present invention are explained below with reference to the accompanying drawings.

Figure 1:
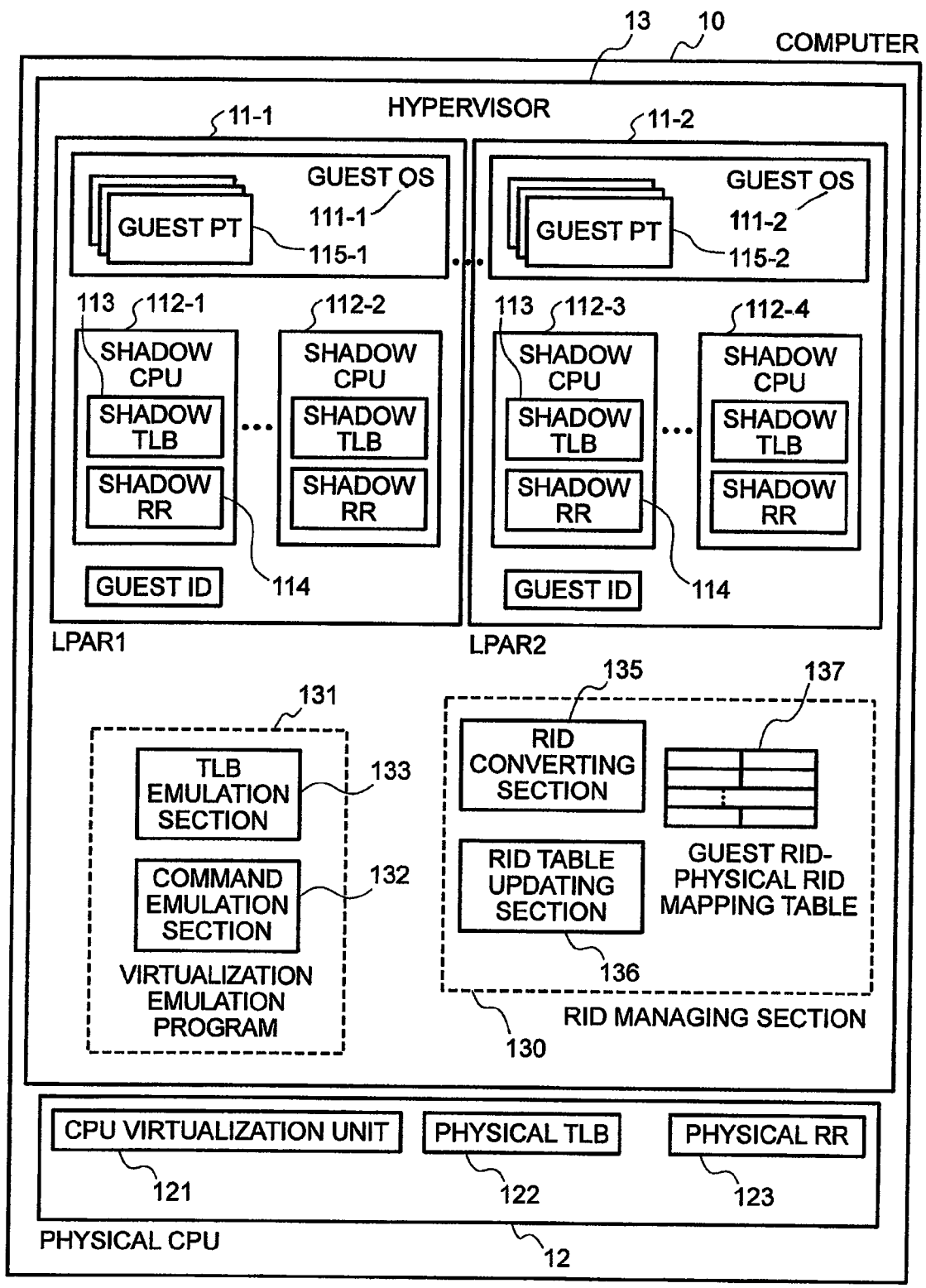
FIG. 1 is a diagram showing a system configuration according to a first embodiment of the present invention.

An example of the structure of a computer according to a first embodiment of the present invention is shown in FIG. 1.

This embodiment concerns a computer virtualization mechanism that causes one or more virtual computers to virtually operate on one actual computer 10. When plural virtual computers are caused to operate on a computer, plural OSs run. The respective OSs run assuming that the OSs occupy all resources of the computer. However, when various resources such as a register of a CPU, a TLB, and other devices for input and output (hereinafter abbreviated as IO) are operated, plural OSs run in a mixed state. When the resources are operated, an unintended state occurs and the resources malfunction. A computer virtualization mechanism that arbitrates processing for the resources in order to prevent the malfunction is a hypervisor 13.

In the following description, resources that look as if being accessed from the virtual computers are affixed with a prefix "guest". Resources of the actual computers are affixed with a prefix "physical" to be distinguished from those of the virtual computers. Components necessary for converting the guest resources into the actual resources are affixed with a prefix "shadow".

For example, values used by a guest OS concerning RIDs, physical addresses, and the like are referred to as guest RIDs, guest physical addresses, and the like. Values used in the actual computer are referred to as physical RIDs, physical addresses, and the like. (Only for the physical addresses, "physical" is used only once to prevent redundancy.)

Figure 2:
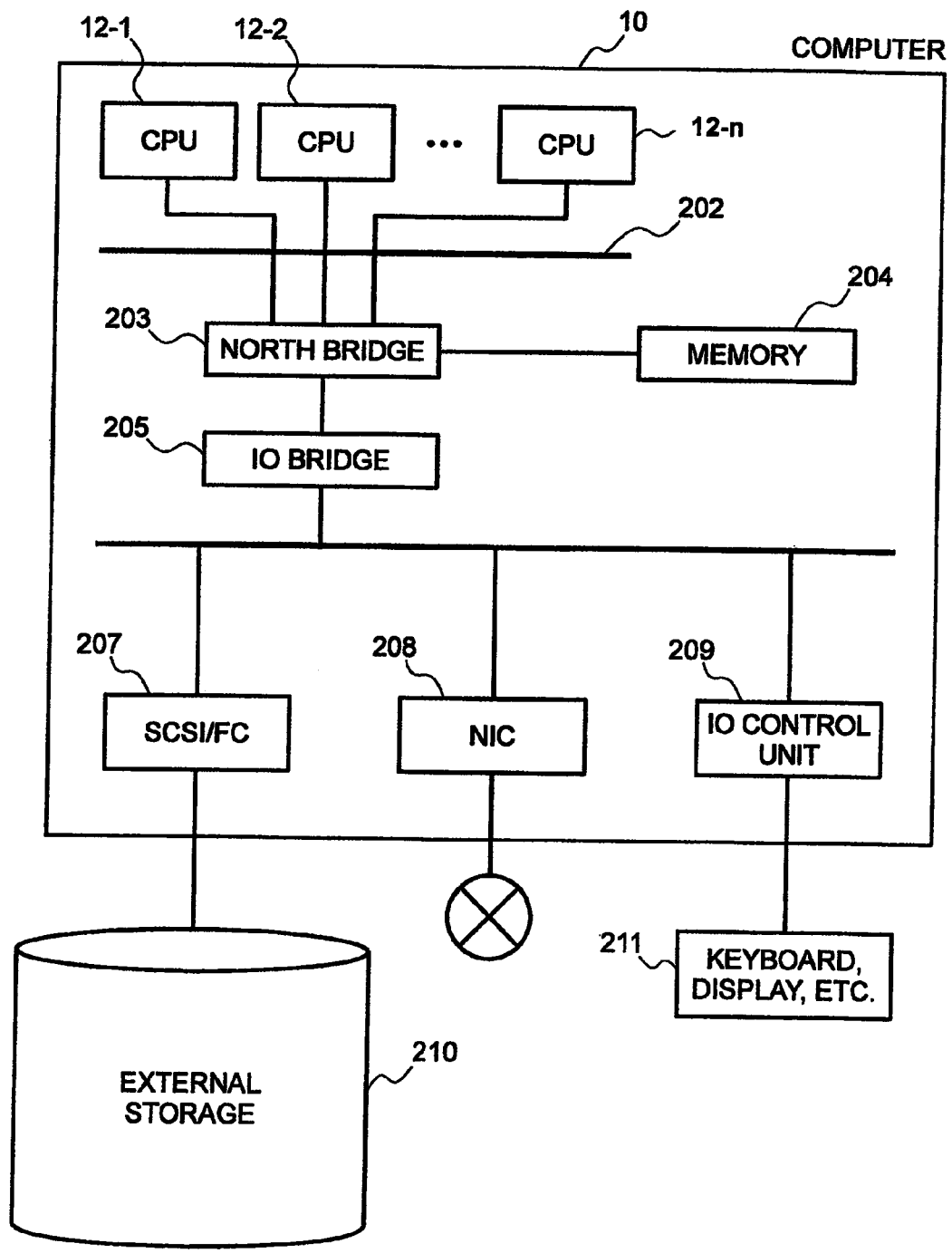
FIG. 2 is a diagram showing an example of the structure of a computer according to the first embodiment.
Figure 3:
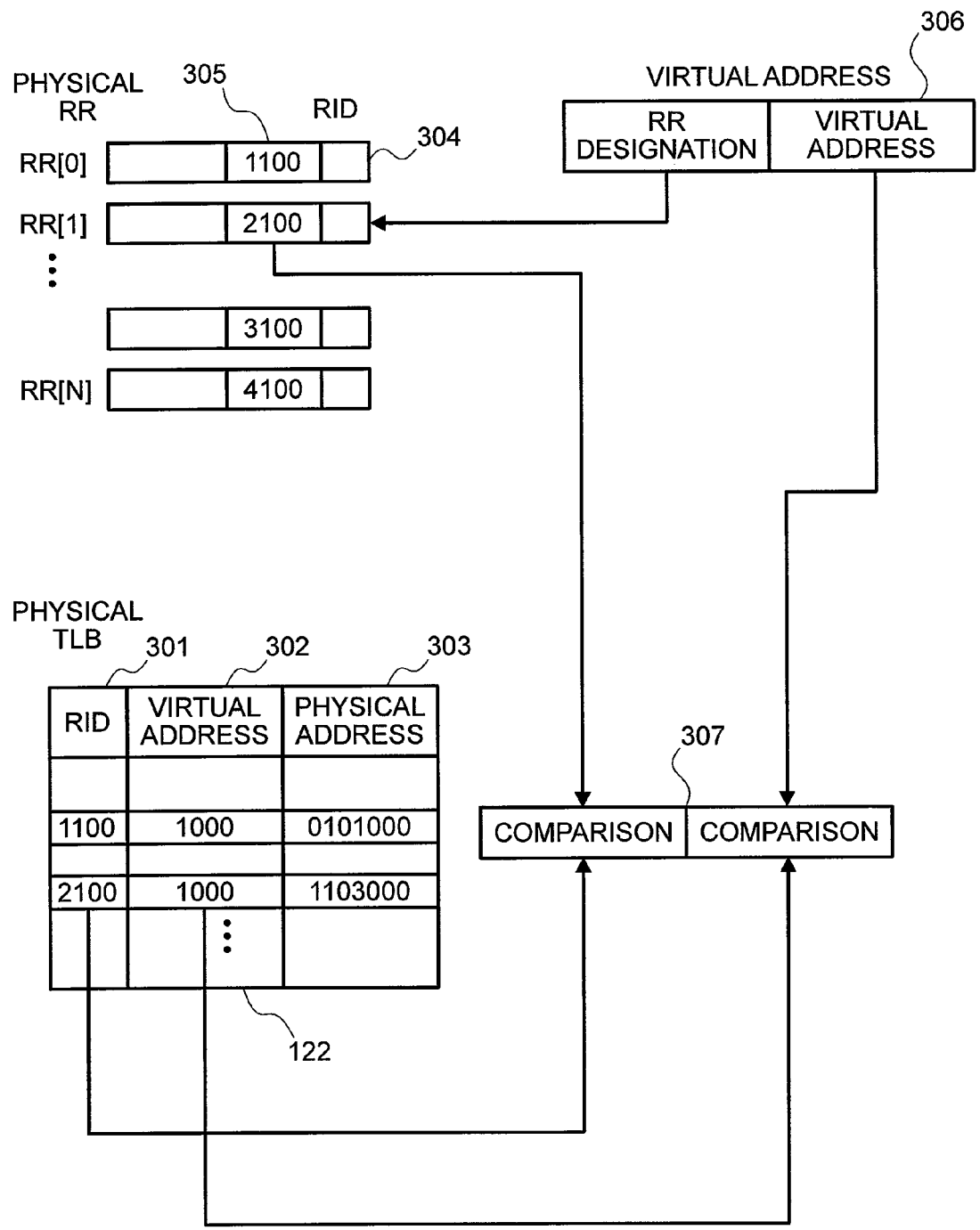
FIG. 3 is a diagram for explaining an example of the structure of a TLB.

The hypervisor 13 is configured as a program that runs on a physical CPU 12. An example of the structure of the actual computer including the physical CPU 12 on which the hypervisor 13 runs is shown in FIG. 2. The computer 10 includes one or more physical CPUs 12 (12-1, 12-2 . . . 12-n) and a memory 204. Programs are stored on the memory 204 and executed by the physical CPU 12. The computer 10 has IO devices such as an IO control unit 209, a network interface card (hereinafter referred to as NIC) 208, and a small computer system interface/fibre channel (hereinafter referred to as SCSI/FC) 207 and is connected to an external storage 210, a keyboard/display 211, and the like. Reference numeral 202 denotes a first bus, 203 denotes a so-called north bridge, 205 denotes an IO bridge, and 206 denotes another internal bus.

The hypervisor 13 executes, for example, initialization of a CPU virtualizing unit 121 of the physical CPU 12 described later, start of loading and execution of programs of the virtual computers by emulation of firmware represented by a basic input/output system (hereinafter referred to as BIOS), execution scheduling of programs on the plural virtual computers, and processing performed when the CPU virtualizing unit 121 needs arbitration of resources.

The virtual computers are treated in a unit called logical partitioning (hereinafter referred to as LPAR) 11. The LPAR 11 is formed as configuration information prepared for each of the virtual computers. The physical CPU 12 performs control on the basis of the configuration information and executes a program. Configuration information concerning a CPU in the configuration information is referred to as shadow CPUs 112 (112-1, 112-2, 112-3, 112-4). Plural OSs 111 (111-1, 111-2) run in parallel. In the following explanation, execution of the programs by the CPU according to the configuration information of the LPAR 11 (11-1 and 11-2) is referred to as an operation on the LPAR 11. The OSs 111 that run on the LPAR 11 are referred to as guest OSs. Reference numeral 115 (115-1 and 115-2) in the guest OSs 111 denotes guest page tables (PTs).

When the program running on the LPAR 11 executes a command for accessing computer resources that need arbitration, the CPU virtualizing unit 121, which is an interface with the program, of the physical CPU 12 detects the command, suspends processing of the program running on the LPAR 11, and executes a virtualization emulation program 131 of the hypervisor 13. The virtualization emulation program 131 executes processing for arbitrating the resources and, then, issues a LPAR 11 resumption command. The physical CPU 12 resumes the processing of the program of the LPAR 11.

The hypervisor 13 includes many program functions. In this embodiment, only functions concerning CPU processing and processing RIDs of TLBs and RRs as an object of this embodiment are shown. Other processing can be realized by the configuration described in Non-Patent Document 1. Details of the processing are not explained here.

As components for the processing of RIDs and RRs, the hypervisor 13 includes the virtualization emulation program 131 and an RID managing section 130. The virtualization emulation program 131 includes a command emulation section 132 and a TLB emulation section 133. The command emulation section 132 is a program for executing, when the program on the LPAR 11 executes a command that needs arbitration, processing for the arbitration.

The TLB emulation section 133 is a program for emulating, when the guest OS 111 on the LPAR 11 is about to operate a physical TLB 122 and a physical RR 123 of the computer, processing for the operation and operating the shadow CPUs 112 of the LPAR 11 corresponding thereto, the physical TLB 122, and the physical RR 123.

The shadow CPUs 112 as configuration information concerning the CPU is stored in a memory 204 shown in FIG. 2. In the configuration of this embodiment shown in FIG. 1, only information related to the TLBs in information of the shadow CPUs 112 is shown. TLB-related configuration information of the shadow CPUs 112 includes shadow TLBs 113, shadow RRs 114, and a guest physical address-physical address mapping table. Since the guest physical address-physical address mapping table is a publicly-known technique in TLB virtualization, illustration and explanation of the guest physical address-physical address mapping table are omitted here.

The shadow TLBs 113 and the shadow RRs 114 have items the same as those of the physical TLB 122 and the physical RR 123. Formats of the shadow TLBs 113 and the shadow RRs 114 are decided by the physical CPU 12. The shadow TLBs 113 can be directly referred to from the physical CPU 12 without performing software processing. The hypervisor 13 can perform address conversion processing, which needs cost (processing time), at high speed by registering appropriate address conversion from a guest virtual address to a physical address in the shadow TLBs 113.

Because of the reasons described above, in this embodiment, conversion pairs including sets of physical RIDs, guest virtual addresses, and physical addresses are registered in the shadow TLBs 113.

The TLB emulation section 133 performs control using the RID managing section 130 in order to efficiently arbitrate TLB information of the plural LPARs 11. The RID managing section 130 includes an RID converting section 135, an RID table updating section 136, and a guest RID-physical RID mapping table 137. The guest RID-physical RID mapping table 137 is a list showing association of the guest RIDs on the virtual computer used by the program on the LPAR and the physical RIDs used in the actual physical CPU. The RID managing section 130 adds an entry to and deletes an entry from the guest RID-physical RID mapping table 137 according to a procedure indicated by this embodiment.

An example of the structure of the guest RID-physical RID mapping table 137 is shown in FIG. 4. The guest RID-physical RID mapping table 137 includes a set of a guest ID 401, a physical RID 402, a guest RID 403, and an entry in-use flag 404.

The guest ID 401 is an identifier uniquely indicating an LPAR. The guest RID 403 and the physical RID 402 indicate an RID on the virtual computer used by a program running on the LPAR and an RID designated by the actual physical CPU, respectively. When an RID setting command on an RR is executed by the program running on the LPAR 11 indicated by the guest RID 403, the RID managing section 130 sets a physical RID associated in the set of the table 137 in the physical RR 123. Details of this procedure are described later.

The entry in-use flag 404 is information indicating whether the physical RID 402 included in an entry is set in an actual physical RR. As a simple implementation example, there is bit information that is 1 when set in the actual physical RR.

As another implementation example indicating an entry set in the actual physical RR, a method of creating, for example, a list of pointers that holds only entries actually used may be used. In a system of the list, it is possible to quickly trace only items actually used. In this embodiment, both the implementation systems can be used. However, for simplification of explanation, the bit information indicated by the former system is used.

When different plural LPARs 11 use identical RIDs, the RID managing section 130 selects, with means described later, different physical RIDs for the respective LPARs and uses the physical RIDs. Consequently, even if the plural LPARs use the identical RIDs in the same period, the physical CPU 12 can distinguish the RIDs as separate RIDs and perform a normal operation as intended by the OS.

As an entry of the guest RID-physical RID mapping table 137, a relevant entry is searched with a physical RID, a guest ID, and a guest RID as key items. In order to quickly perform such a search, an algorithm and a data structure for increasing the speed of the search such as a hash table and an N-ary tree may be freely added. However, in this embodiment, for simplification of explanation, the increases in speed are not explained.

Since a format of the shadow TLB 113 is determined by the CPU, there is a limitation in performing such various increases in speed. In this system, since the guest RID-physical RID mapping table 137 independently added is used as the data structure, the various increases in speed can be freely performed.

In the following explanation, operations of respective programs in the hypervisor 13 are explained and, then, an overall operation and effects of the present invention are explained.

Operations of the virtualization emulation program 131 and the TLB emulation section 133 according to this embodiment are explained with reference to a flowchart shown in FIG. 6.

When a program executes a command that needs arbitration processing, the physical CPU 12 causes a virtualization exception (step 601). In this case, the physical CPU 12 records a factor of virtualization with a method of, for example, writing information concerning the factor in a predetermined position of a memory. The virtualization emulation program 131 starts processing when the virtualization exception occurs.

The virtualization emulation program 131 acquires, with reference to configuration information arranged in a specific memory address of the CPU, a guest ID of an LPAR in which the program causing the virtualization exception runs (step 602).

The virtualization emulation program 131 checks the factor of the virtualization exception and executes processing corresponding to the factor. The virtualization emulation program 131 checks whether the physical CPU 12 has detected a command for writing in a guest RR and suspended the processing. When the physical CPU 12 has detected the writing command and suspended the processing, the virtualization emulation program 131 executes the TLB emulation section 133 (step 603).

The TLB emulation section 133 acquires a value of a guest RID about to be written in the guest RR with reference to the command that causes the virtualization exception, a command operand, and a register (step 604).

The TLB emulation section 133 executes the RID conversion section 135 using values of the guest ID acquired in step 602 and the guest RID acquired in step 604 as input values. As a result, the TLB emulation section 133 obtains a physical RID value (hereinafter referred to as physical RID(A)) (step 605).

The TLB emulation section 133 acquires a physical RID value presently set in the physical RR (hereinafter referred to as physical RID(B)) (step 606). The TLB emulation section 133 sets an entry in-use flag of an entry including the physical RID(B) value to 0 in the guest RID-physical RID mapping table 137 (step 607).

The TLB emulation section 133 sets the physical RID(A) value in the physical RR 123 (step 608).

The TLB emulation section 133 sets an entry in-use flag of an entry including the physical RID(A) value to 1 in the guest RID-physical RID mapping table 137 (step 609).

Operations of the RID converting section 135 in this embodiment are explained with reference to a flowchart shown in FIG. 7.

Figure 6:
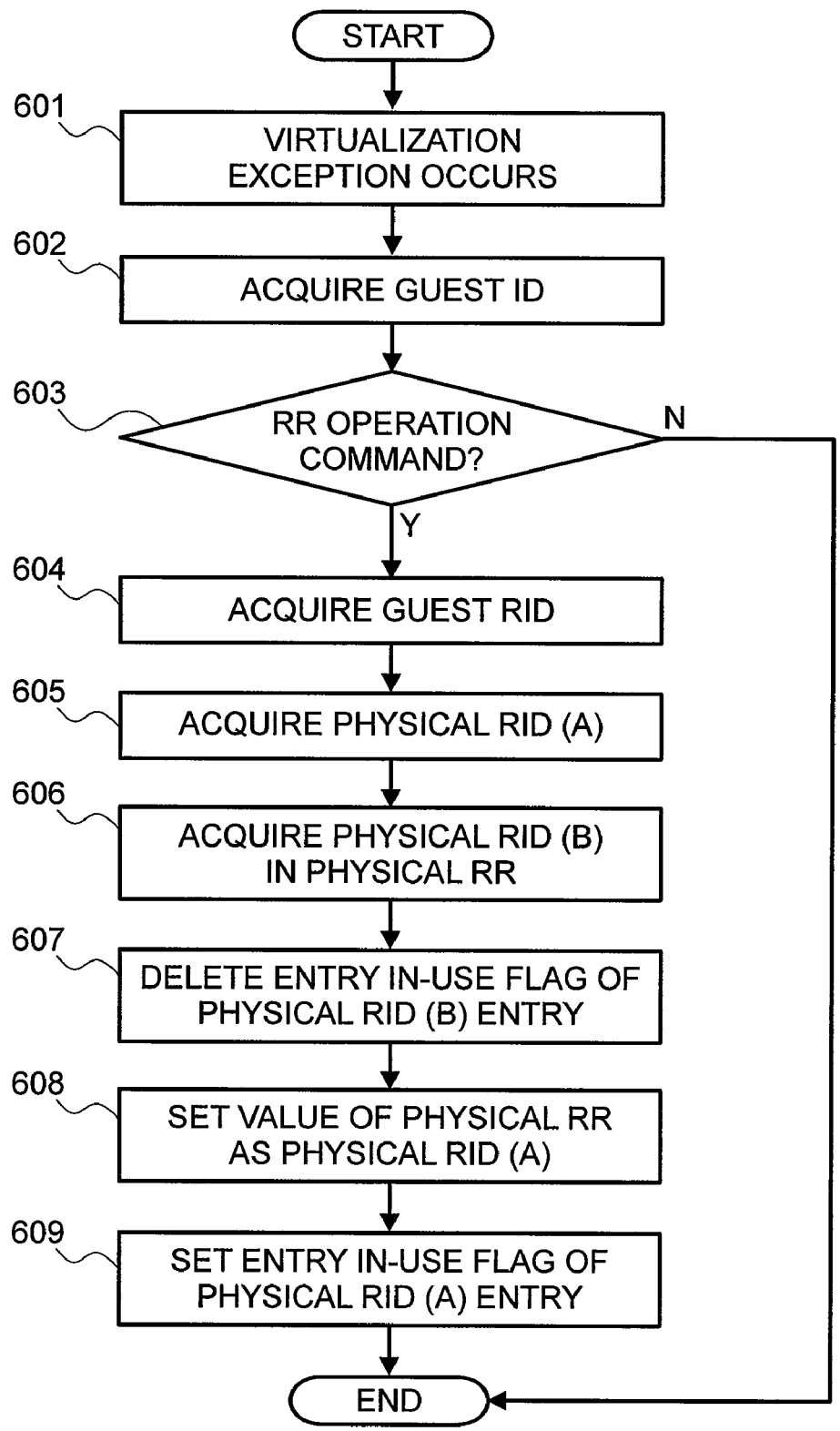
FIG. 6 is a flowchart of a TLB emulation section according to the first embodiment.

The RID converting section 135 is given the guest ID of the LPAR that causes the virtualization exception and the guest RID acquired in step 604 in FIG. 6 as input information of the program and is started. The RID converting section 135 searches for an entry of a physical RID equal to a guest ID and a guest RID, to which the guest ID 401 and the guest RID 403 are given as inputs of the program, respectively, with reference to the guest RID-physical RID mapping table 137 (step 701).

When a relevant entry cannot be found in step 701, the RID converting section 135 executes step 703. When a relevant entry is found, the RID converting section 135 returns a value of the physical RID included in the entry as a result of the execution of the program (step 702).

When a relevant entry cannot be found, the RID converting section 135 gives the guest ID and the guest RID, which are given as the input of the program, to the RID table updating section 136 as input information and executes the RID table update section 136. As a result, the RID converting section 135 obtains a physical RID value not included in the physical RIDs 402 of all the entries of the guest RID-physical RID mapping table 137 and returns the physical RID value as a result of the execution of the program (step 703).

Operations of the RID table updating section 136 are explained with reference to a flowchart shown in FIG. 8.

The RID table updating section 136 searches for a physical RID not included in the physical RIDs 402 of all the entries in the guest RID-physical RID mapping table 137 (hereinafter referred to as unused physical RID) with reference to the guest RID-physical RID mapping table 137 (step 801).

There are implementation examples of a method of searching for an unused physical RID as described below. In a first implementation example, as a premise, data rows of the guest RID-physical RID mapping table 137 are always sorted according to the physical RIDs 402. The method can be easily implemented by, for example, implementation for storing information concerning a program in a chain list format or the like and inserting an entry in a section satisfying the premise during registration. In step 801, the RID table updating section 136 refers to entries of the table 137 one by one from the top. When a value of a certain entry A, a value of the physical RID 402, and a value of the physical RID 402 in an entry B immediately preceding the entry A are not continuous, since a value between the values of the physical RIDs 402 are unused, this value is selected as an unused physical RID.

As a second implementation example for searching for an unused physical RID, there is a method of preparing a bitmap table for all physical RIDs. When a certain physical RID is included in an entry of the guest RID-physical RID mapping table 137, a bit corresponding to a physical RID of the bitmap table is 1. The RID table updating section 136 selects an arbitrary integer at random and sets the arbitrary integer as a tentative physical RID. The RID table updating section 136 refers to a bit of the bitmap table corresponding to the tentative physical RID. When the referred bit is 0, the RID table updating section 136 changes the bit to 1 and selects the tentative physical RID as an unused physical RID. If the bit is 1, the RID table updating section 136 repeats the method from the step of selecting an arbitrary integer.

These methods may be used in combination. For example, when a physical RID cannot be determined even if the selection of an arbitrary integer in the second implementation example is repeated plural times, the method may be changed to the first method.

When an unused physical RID cannot be found, the RID table updating section 136 executes steps 803 to 806. When an unused physical RID is found, the RID table updating section 136 skips steps 803 to 806 and executes step 807 and subsequent steps (step 802).

The RID table updating section 136 selects one entry, in which the entry in-use flag 404 is 0, from the guest RID-physical RID mapping table 137 (step 803). As an example of a method for selection, besides a method of selecting an entry at random, for example, there is a method of adding items for storing information representing creation times of entries, time when the entry in-use flag 404 is changed to 1 last, and time when the entry in-use flag 404 is changed to 0 last to the guest RID-physical RID mapping table 137 and deleting an entry with the oldest time. To reduce influence of the other LPARs, a method of preferentially deleting an entry in which a guest ID given as an input of a program and the guest ID 401 of the entry coincide with each other may be adopted.

The RID table updating section 136 deletes, with reference to the guest ID 401 and the physical RID 402 included in the entry selected in step 803, a TLB entry in which a value of the physical RID 402 included in the entry selected in step 803 and a value of the RID 301 in the TLB entry are equal from the shadow TLB 113 in the shadow CPU 112 belonging to the LPAR 11 indicated by the guest ID 401 (step 804).

The RID table updating section 136 deletes a relevant entry from the TLB of the physical CPU 12 as well (step 805). In step 805, in the case of a cache format (a TLB cache) that does not guarantee persistence of the entry, the RID table updating section 136 may delete unnecessary entries other than the deletion object entry. In other words, the RID table updating section 136 may clear all the physical TLBs 122. After this step is executed, the physical RID included in the entry selected in step 803 changes to an unused state.

The RID table updating section 136 registers a set of the unused physical RID selected in step 802 or 804 and the guest ID and the guest RID given as the input of the program in the guest RID-physical RID mapping table 137 (step 806).

The RID table updating section 136 returns the physical RID registered in step 806 as a result of the execution of the program (step 807).

Figure 9:
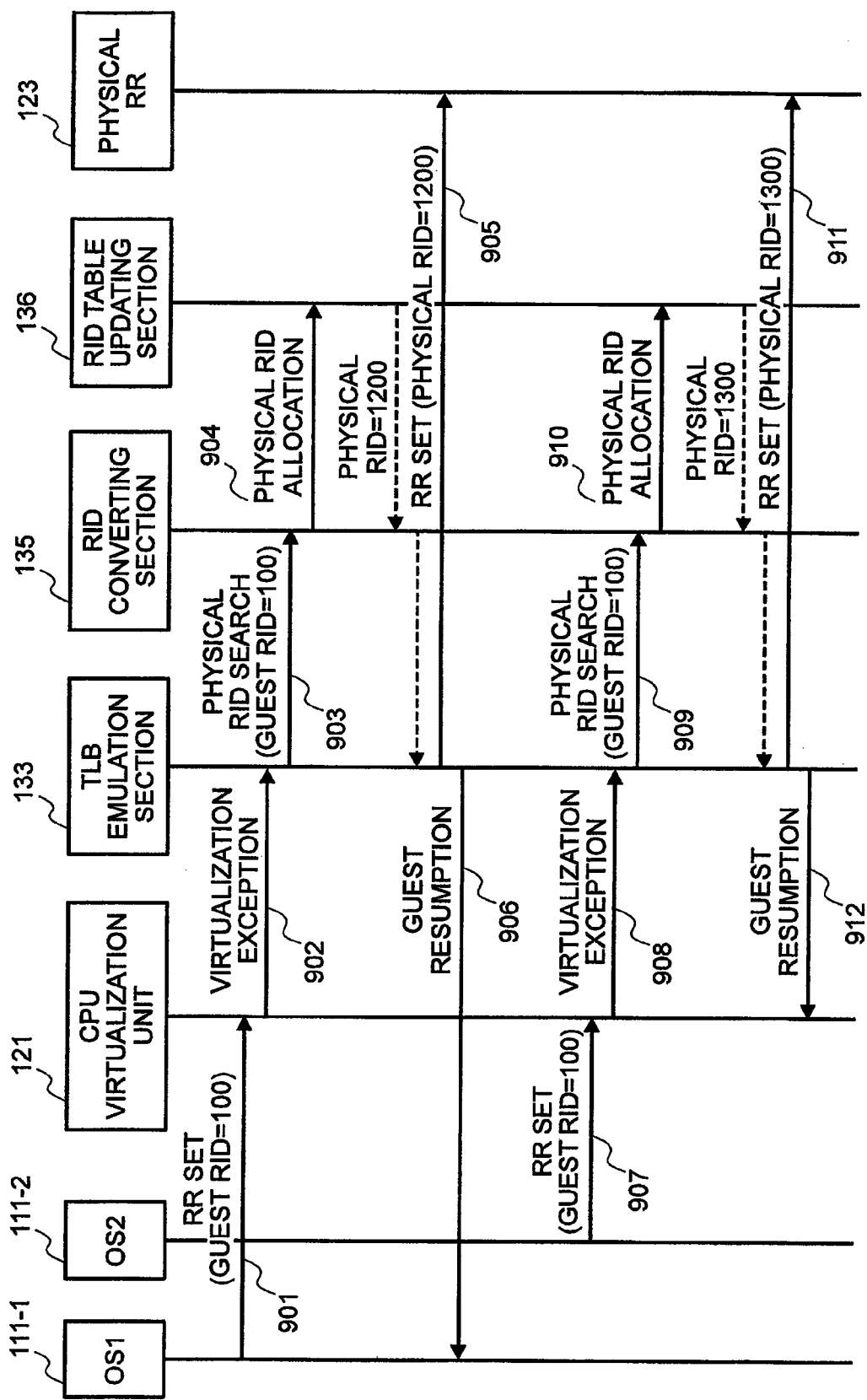
FIG. 9 is a diagram showing an example of operations of a hypervisor 13 according to the first embodiment.

A flow in the entire virtualization mechanism at the time when a guest OS on an LPAR sets a value in an RR according to this embodiment explained above is explained with reference to FIG. 9.

First, for simplification of explanation, it is assumed that values of the guest RIDs of all the entries of the guest RID-physical RID mapping table 137 are not 100. It is assumed that two LPARs, i.e., an LPAR 1 and an LPAR 2 are running in the system.

A guest OS 111-1 running on the LPAR 1 executes a command for setting 100 in a guest RR (step 901).

The CPU virtualizing unit 121 detects that the value is set in the guest RR and causes a virtualization exception (step 902).

The virtualization emulation program 131 executes the TLB emulation section 133 according to the procedure shown in FIG. 6. The TLB emulation section 133 invokes the RID converting section 135 (step 903).

Figure 7:
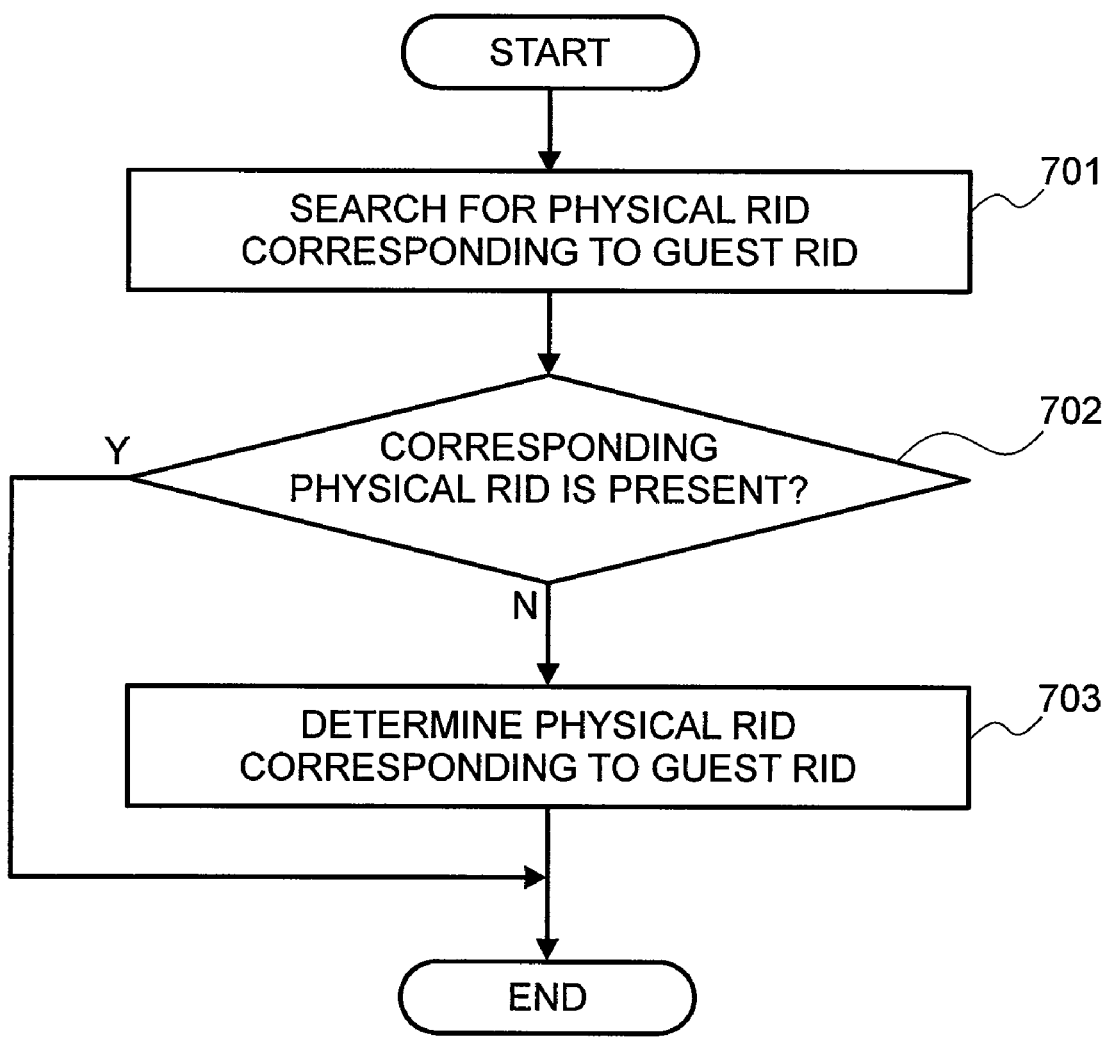
FIG. 7 is a processing flowchart of an RID converting section according to the first embodiment.

The RID converting section 135 searches for a physical RID according to the procedure in FIG. 7. However, the RID converting section 135 cannot find an entry corresponding to a set of the guest OS 111-1 and a guest RID 100 and executes the RID table updating section 136. The RID table updating section 136 selects a physical RID (in this example, a physical RID 1200) corresponding to a virtual RID according to a method shown in FIG. 8 and creates an entry of [guest ID=1, guest RID=100, physical RID=1200] (step 904).

The TLB emulation section 133 sets 1200 in a physical RR (step 905).

The hypervisor 13 finishes the emulation and resumes the processing of the LPAR 1 (step 906).

After step 906, a guest OS 111-2 running on the LPAR 2 operates and executes a command for setting 100 in an RR (step 907).

The CPU virtualizing unit 121 detects that a value is set in the guest RR and causes a virtualization exception (step 908).

The virtualization emulation program 131 executes the TLB emulation section 133 according to the procedure shown in FIG. 6. The TLB emulation section 133 invokes the RID converting section 135 (step 909).

The RID converting section 135 searches for a physical RID according to the procedure shown in FIG. 7. However, the RID converting section 135 cannot find an entry corresponding to a set of the guest OS 111-2 and the guest RID 100 and executes the RID table updating section 136. The RID table updating section 136 selects a physical RID (in this example, a physical RID 1300) corresponding to a virtual RID anew according to the method shown in FIG. 8 and creates an entry [guest ID=2, guest RID=100, physical RID=1300] (step 910).

The TLB emulation section 133 sets 1300 in the physical RR (step 911).

The hypervisor 13 finishes the emulation and resumes the processing of the LPAR 2 (step 912).

As described above, with the configuration according to this embodiment, even if two guest OSs use the same RIDs (guest RIDs), since the hypervisor 13 allocates different unused physical RIDs to the guest RIDs, the RIDs can be distinguished. Therefore, TLB entries of the two guest OSs are not used in a mixed state.

According to this embodiment, a bit range representing an LPAR is not present in all values of physical RIDs. The number of entries of the guest RID-physical RID mapping table 137 depends on only a load of the memory 204. Therefore, there is substantially no limit in the number of LPARs that can be simultaneously started.

Second Embodiment

Figure 8:
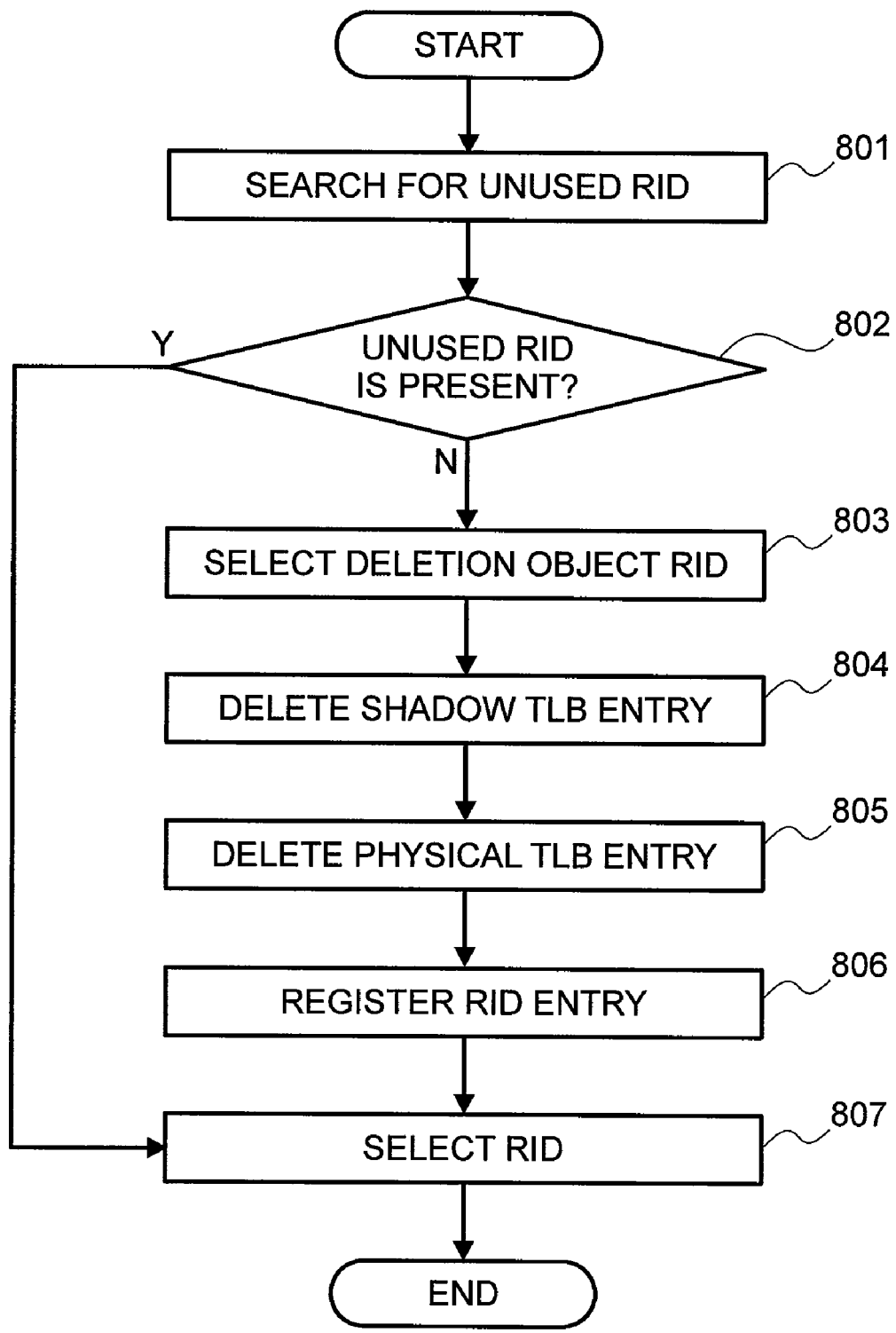
FIG. 8 is a processing flowchart of an RID table updating section according to the first embodiment.

In the first embodiment, an entry once registered in the guest RID-physical RID mapping table 137 is not deleted unless the entry is selected as a deletion object RID in step 803 shown in FIG. 8.

In the guest OSs 111, in general, one or more memory spaces are exclusively allocated to one process. In other words, the memory spaces and guest RIDs allocated to the memory spaces are discarded when the process is finished.

Until the guest OSs allocate the discarded guest RIDs to memory spaces allocated to another process again, entries of the guest RIDS are not used. When the process is finished, the entries of the guest RIDs associated with the finished process may be deleted from the guest RID-physical RID mapping table 137.

The hypervisor 13 can detect that a guest uses a new RID with setting of a value in an RR as an opportunity. However, there is no method of detecting the finish of the process. Therefore, the hypervisor 13 cannot delete the entries at timing of the finish of the process.

Therefore, in a second embodiment of the present invention, a configuration and a procedure for managing information for judging whether an entry may be explicitly deleted are added to the first embodiment. A method and a configuration for automatically deleting a registered entry are disclosed.

For this purpose, in this embodiment, the guest RID-physical RID mapping table 137 in the first embodiment is expanded as shown in FIG. 10.

The number of registered entries 1001 added in the table 137 as a new item is the number of TLB entries that have a value of the physical RID 420 as a value of the RID 301 of the TLB entry in the shadow TLB 113 shown in FIG. 1. When the number of registered entries 1001 is larger than 0, this indicates that associated entries are likely to be referred to from the CPU. Conversely, an entry of the guest RID-physical RID mapping table 137 in which the physical RID 402, which is not likely to be referred to from the CPU, is recorded can be discarded.

Figure 11:
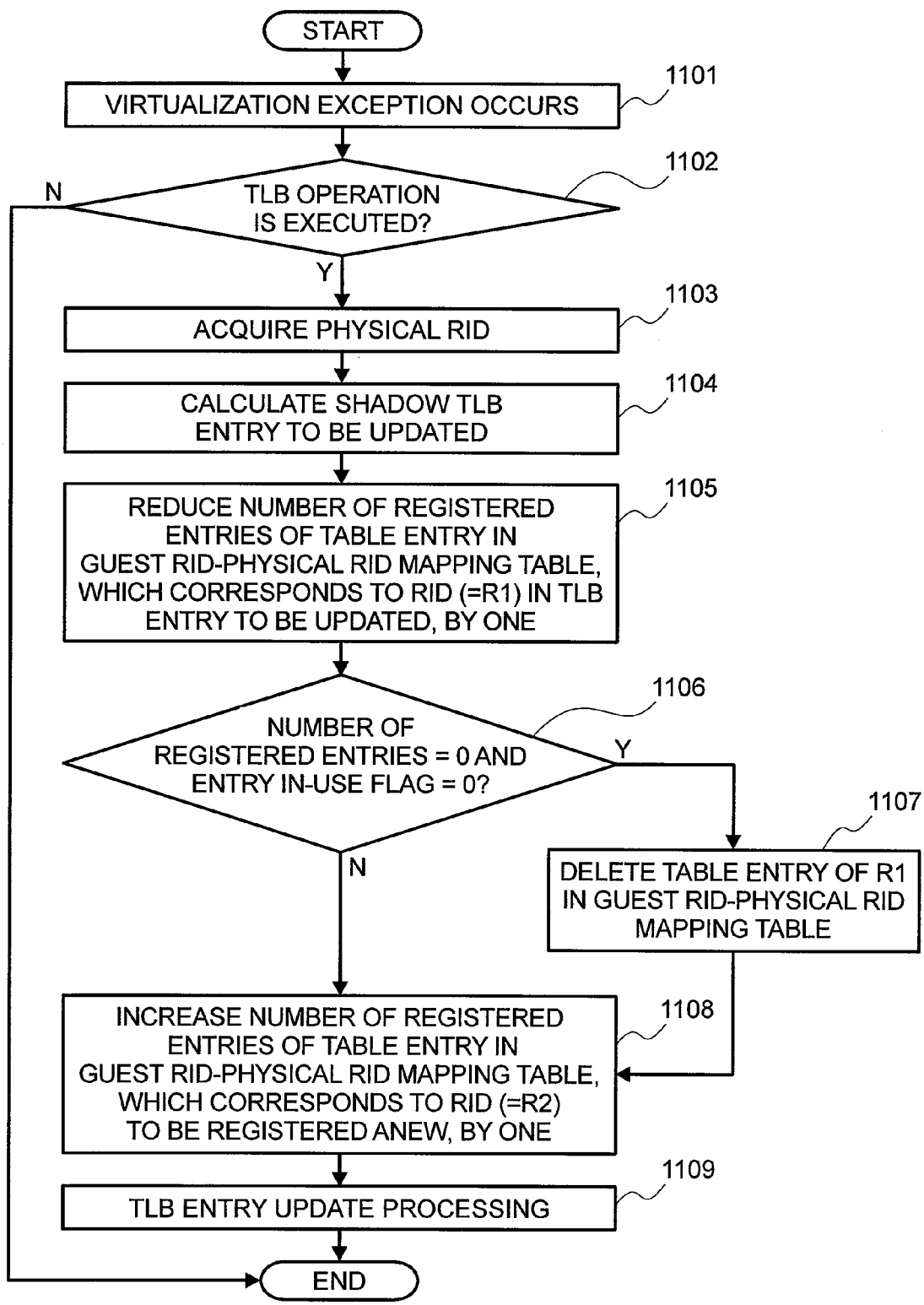
FIG. 11 is a processing flowchart during TLB entry registration and TLB entry deletion command emulation according to the second embodiment.

A procedure for updating the number of registered entries 1001 of the guest RID-physical RID mapping table 137 in this embodiment is shown in a flowchart in FIG. 11. An entry is deleted from the guest RID-physical RID mapping table 137 according to a procedure described below.

As in step 601 in FIG. 6, the physical CPU 12 causes a virtualization exception (step 1101).

In a method the same as step 602, the virtualization emulation program 131 acquires a factor that causes the virtualization exception. The virtualization emulation program 131 checks whether a program on an LPAR has detected a command for execution of shadow TLB operation, i.e., TLB entry registration or TLB entry deletion and suspended processing. When the program has detected the command and suspended the processing, the virtualization emulation program 131 executes the TLB emulation section 133 (step 1102).

The TLB emulation section 133 executes the RID converting section 135 in the same method as step 703 in FIG. 7 and acquires a physical RID as a result of the execution (step 1103).

The TLB emulation section 133 selects an entry of a shadow TLB as an update object according to a rule set in the architecture of the CPU 12 (step 1104).

For example, in the example of the architecture of Itanium (registered trademark), an index in a TLB is determined by a hash function with a set of the physical RID acquired in step 1103 and a virtual address designated in the TLB operation command of the LPAR, which causes the virtualization exception, set as an input value and an entry designated in the index is selected.

The TLB emulation section 133 designates a physical RID included in the shadow TLB entry acquired in step 1104 as an input value and issues entry deletion notification to the RID table updating section 136. The RID table updating section 136 receives the entry deletion notification. The RID table updating section 136 searches for entries having the physical RID included in the entry selected in step 1104 as a value (R1) of the physical RID 402 from the guest RID-physical RID mapping table 137 and reduces a value of the number of registered entries 1001 of the entries, which is obtained as a result of the search, by one (step 1105).

After the execution of step 1105, when the number of registered entries 1001 decreases to 0 and the entry in-use flag 404 decreases to 0, the RID table updating section 136 executes step 1107. Otherwise, the RID table updating section 136 skips step 1107 and executes step 1108 and subsequent steps (step 1106).

The RID table updating section 136 deletes an entry in which the entry in-use flag 404 is 0 among the entries obtained as a result of the search in step 1105 from the guest RID-physical RID mapping table 137 (step 1107).

The TLB emulation section 133 designates the physical RID acquired in step 1103 as an input value and issues entry registration notification to the RID table updating section 136. The RID table updating section 136 receives the entry registration notification. The RID table updating section 136 searches for entries having the physical RID acquired in step 1103 as a value (R2) of the physical RID 402 from the guest RID-physical RID mapping table 137 and increases a value of the number of registered entries 1001 of entries, which is obtained as a result of the search, by one (step 1008). The TLB emulation section 133 updates the entry of the shadow TLB 113 selected in step 1004 and the entry of the physical TLB 122 to contents set in the architecture of the CPU (step 1109).

With the method according to the second embodiment explained above in detail, the TLB emulation section 133 can automatically delete an entry that is not referred to from the shadow TLB 113 and becomes unnecessary among the entries included in the guest RID-physical RID mapping table 137.

Third Embodiment

Depending on the architecture of the CPU, there is an operation for deleting all entries of a TLB. In the configuration including the shadow TLB, when the operation for deleting all entries is emulated, all shadow TLB entries have to be deleted in the operation. This processing takes time.

In a third embodiment of the present invention, in order to the increase speed of emulation for deleting all TLB entries, the configuration and the processing procedure in the second embodiment are further expanded.

In the third embodiment, at a point of deletion of all TLB entries, all entries in the guest RID-physical RID mapping table 137 for a relevant guest ID are invalidated and another physical RID is allocated to a virtual RID set in a physical RR at present. According to this procedure, a physical RID included in an invalidated entry is not set in a physical RR and an entry of a shadow TLB including the physical RR is not referred to from the physical CPU 12. In other words, there is an effect equivalent to deletion of the entry.

When the invalidated physical RID is reallocated to another entry and used in a later operation, processing for deletion of a TLB entry that uses the physical RID to be reused has to be performed. However, the processing only has to be related to a specific physical RID. Therefore, time for performing emulation processing once is short compared with that in the all entry deletion. After execution of a command for deleting all TLB entries, it is likely that another TLB registration command overwrites an entry, which should be deleted at the time of the execution of the command for deleting all TLB entries, with another entry. In this case, since the invalid entry is overwritten with the valid entry and automatically deleted, it is unnecessary to delete the entry. Therefore, a total number of entries that have to be deleted also decreases. In this way, time for performing emulation processing once and total processing time can be reduced by delaying the deletion.

In this embodiment, the guest RID-physical RID mapping table 137 is expanded. An example of expansion is shown in FIG. 5.

Figure 12:
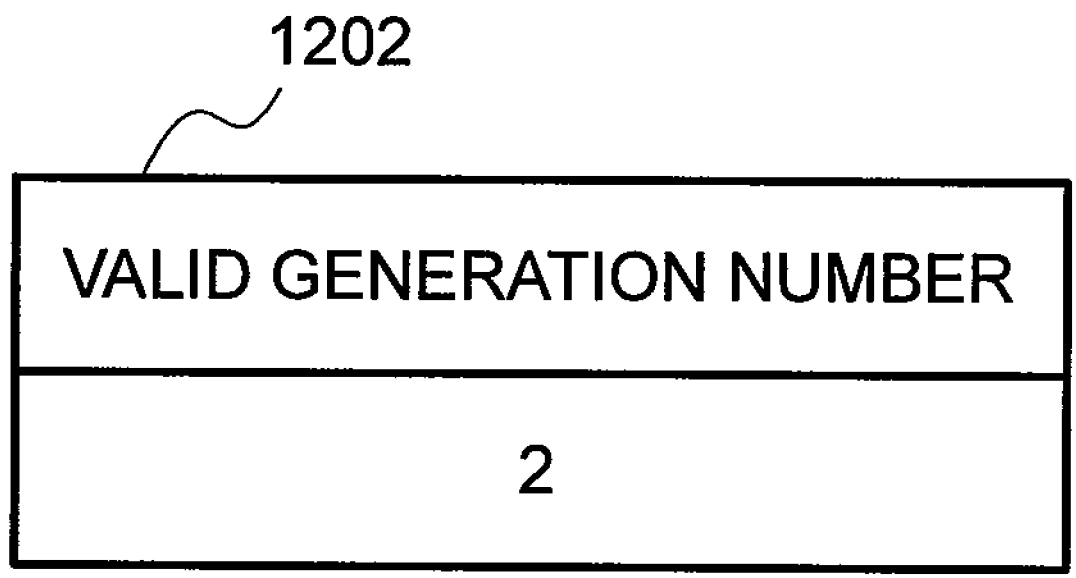
FIG. 12 is a diagram showing an example of a valid generation number of the hypervisor 13 according to the third embodiment.

Respective entries of the guest RID-physical RID mapping table 137 shown in FIG. 5 further include a generation number 1201 as an item. When the generation number 1201 of an entry is identical with a valid generation number 1202 of the hypervisor 13 shown in FIG. 12, the entry is valid.

Processing in performing the emulation processing for the command for deleting all TLB entries in this embodiment is explained with reference to a flowchart in FIG. 13.

The TLB emulation section 133 issues a command for deleting all entries in the guest RID-physical RID mapping table 137 to the RID table updating section 136.

The RID table updating section 136 executes steps 1302 to 1305 on all entries in which the entry in-use flag 404 of the guest RID-physical RID mapping table 137 is 1 (hereinafter referred to as entry B) (step 1301).

The RID table updating section 136 selects an unused physical RID with a method identical with step 801 in FIG. 8. However, it is assumed that an entry having the generation number 1201 different from the valid generation number 1202 is invalid and treated as not being present (step 1302).

The RID table updating section 136 changes the physical RID 402 of the entry B to a value of the unused physical RID selected in step 1302 (step 1303) and adds 1 to the generation number 1201 of the entry B (step 1304). The RID table updating section 136 notifies the TLB emulation section 133 of the value of the unused physical RID selected in step 1302.

The TLB emulation section 133 changes a value of the physical RR 123 corresponding thereto to a value of the unused physical RID selected in step 1302 (step 1305).

The RID table updating section 136 increase a value of the valid generation number 1202 by one (step 1306).

In the processing of the RID converting section 135 in FIG. 7 and the processing of the RID table updating section 136 in FIG. 8, in steps 701 and 801, an entry in which the valid generation number 1202 and the generation number 1201 are different is treated as not being present and a physical RID in which the entry is not present is treated as being able to be selected as an unused physical RID. However, when a physical RID in which an entry with different generation numbers is present is selected as an unused physical RID, the processing for shadow TLB clear in steps 804 and 805 is executed.

In the processing procedure of the TLB emulation section 133 in FIG. 11, an entry with different generation numbers is also an update object in the processing in steps 1103 to 1109.

Figure 13:
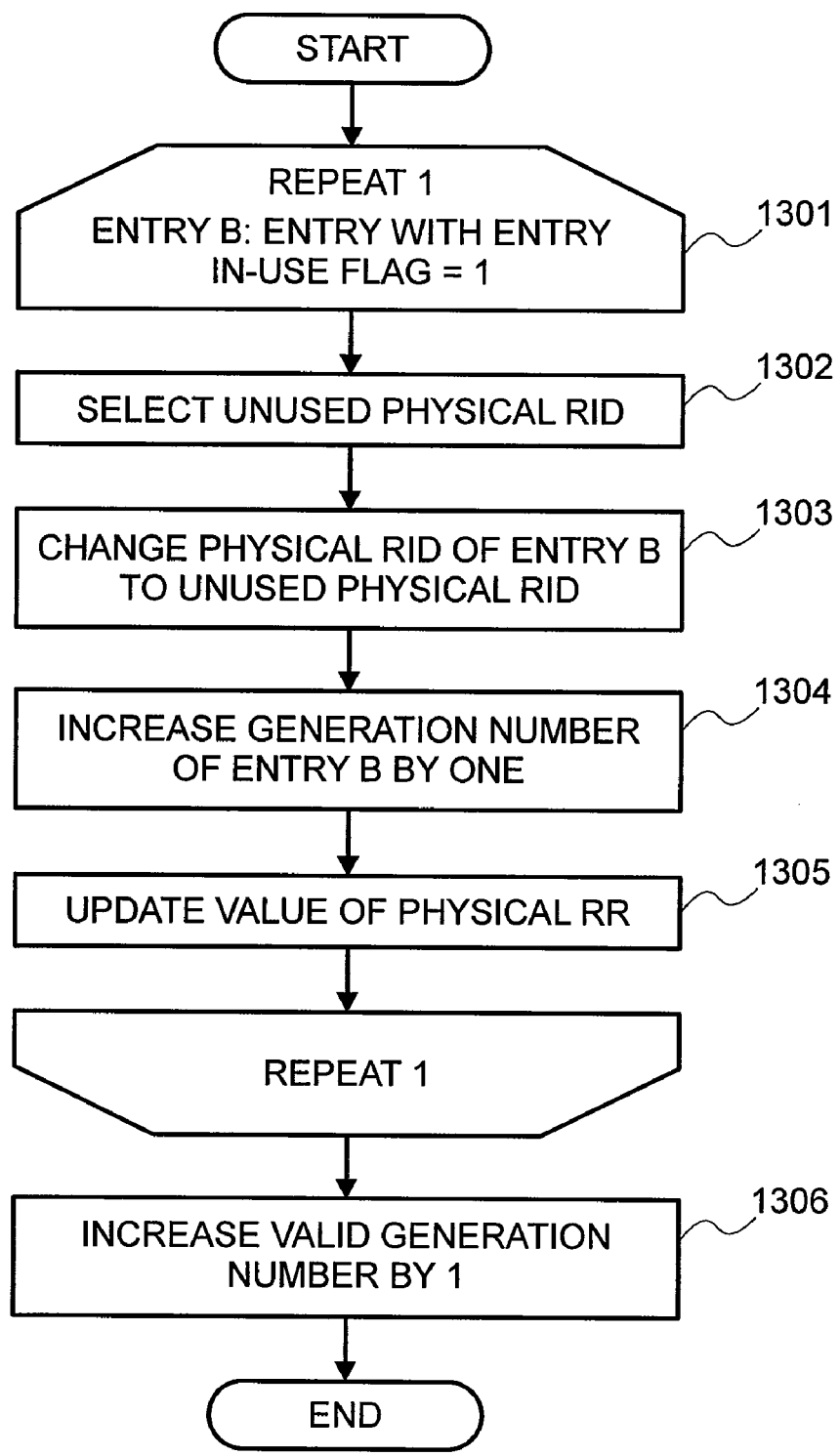
FIG. 13 is a processing flowchart during TLB all entry deletion command emulation according to the third embodiment.

According to the third embodiment explained above, the TLB emulation section 133 performs, using the RID managing section 130, the emulation processing for a command for deleting all TLB entries according to the procedure shown in FIG. 13 while guaranteeing that emulation is correctly performed according to the procedures shown in FIGS. 7, 8, and 11. Consequently, it is possible to increase speed of the processing for deleting all TLB entries.

Since RIDs (physical RIDs) of an actual computer are controlled not to be redundantly allocated to plural virtual computers in a mapping table for RID conversion, the plural virtual computers do not use an identical RID (physical RID) and an OS does not perform unintended conversion. Since an identifier or the like of a virtual computer is not included in a value of an RID, the RID is not limited.

The invention claimed is:

1. A computer virtualization mechanism that causes an actual computer to simultaneously operate plural operating systems (OSs) to function as plural virtualized computers, the computer virtualization mechanism comprising:
a mapping table for managing an association of identifiers of memory spaces on each of the virtualized computers (guest region identifiers (RIDs)) and identifiers used in the actual computer (physical RIDs);
an RID converting section that converts the guest RIDs into the physical RIDs with emulation processing for substituting the guest RIDs as an opportunity with reference to the mapping table; and
an RID table updating section that creates, when the association of the guest RIDs and the physical RIDs is not present in the mapping table, a new association of the guest RIDs and the physical RIDs and adds the new association to the mapping table,
wherein
the virtualized computer includes a shadow translation look-aside buffer (TLB) in which a reference result of the mapping table is used,
the mapping table further includes an item indicating a number of registered entries for counting a number of the physical RIDs used in the shadow TLB,
the RID table updating section is configured to:
select an entry of the shadow TLB as an update object,
execute a first search for an entry of the mapping table corresponding to the physical RID contained in the selected entry of the shadow TLB,
reduce the number of registered entries of the entry of the mapping table obtained from the first search,
in a case where the number of registered entries is 0, delete the entry of the mapping table from the mapping table, and
in a case where the number of registered entries is not 0, execute a second search for another entry of the mapping table corresponding to a physical RID converted from a guest RID by the RID converting section, and increase the number of registered entries of the another entry of the mapping table obtained from the second search.

2. A computer virtualization apparatus according to claim 1, wherein, when the virtualized computer executes the deletion of all shadow TLB items,
the shadow TLB updating section discards registered contents corresponding to the virtualized computer in the mapping table, and
the virtualized computer deletes, in reusing discarded one of the physical RIDs, an entry in which the discarded physical RID is used in the TLB.

3. A computer virtualization apparatus according to claim 2, wherein
the mapping table further includes an item indicating a generation number of the association, and
the table updating section adds, in reusing the discarded physical RID, 1 to the generation number corresponding thereto.

4. A computer virtualization method by a hypervisor for causing plural operating systems (OSs) to simultaneously run on an actual computer having one or more central processing unit and a memory, wherein the hypervisor forms a mapping table for managing association of identifiers of memory spaces on a virtualized computer (hereinafter, guest region identifiers (RIDs)) and identifiers used in the actual computer (hereinafter, physical RIDs), converts the guest RIDs into the physical RIDs corresponding thereto with emulation processing for substituting the guest RIDs as an opportunity with reference to the mapping table, and creates, when the association of the guest RIDs and the physical RIDs is not present, new association and adds the association in the mapping table wherein the virtualized computer includes a shadow TLB in which a reference result of the mapping table is used,
the computer virtualization method performed by the hypervisor comprising:
setting, in the mapping table, a number of registered entries for counting a number of the physical RIDs used in the shadow translation look-aside buffer (TLB);
selecting an entry of the shadow TLB as an update object, executing a first search for an entry of the mapping table corresponding to the physical RID contained in the selected entry of the shadow TLB,
reducing the number of registered entries of the entry of the mapping table obtained from the first search,
in a case where the number of registered entries is 0, deleting the entry of the mapping table from the mapping table, and
in a case where the number of registered entries is not 0, executing a second search for another entry of the mapping table corresponding to a physical RID converted from a guest RID by the RID converting section, and increasing the number of registered entries of the another entry of the mapping table obtained from the second search.

5. A computer virtualization method according to claim 4, wherein, when the virtualized computer executes deletion of all items of the shadow TLB, the hypervisor discards registered contents corresponding to the virtualized computer in the mapping table and deletes, in reusing discarded one of the physical RIDs, an entry remaining in the shadow TLB in which the discarded physical ID is used.

6. A computer virtualization method according to claim 5, wherein the hypervisor sets an item indicating a generation number of the association in the mapping table and adds, in reusing the discarded physical RID, 1 to the generation number corresponding thereto.

* * * * *